(12) United States Patent
Saito et al.

(10) Patent No.: US 6,198,621 B1
(45) Date of Patent: Mar. 6, 2001

(54) ELECTRIC DOUBLE LAYER CAPACITOR USING POLARIZABLE ELECTRODE OF SINGLE PARTICLE LAYER

(75) Inventors: Takashi Saito; Yukari Kibi, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/243,310

(22) Filed: Feb. 2, 1999

(30) Foreign Application Priority Data

Feb. 5, 1998 (JP) .................................................. 10-039680

(51) Int. Cl.$^7$ ....................................................... H01G 9/00
(52) U.S. Cl. ....................... 361/502; 29/25.03; 423/445 R
(58) Field of Search ................................. 361/502, 508, 361/512, 516, 528, 532; 29/25.03; 502/416; 423/445 R

(56) References Cited

U.S. PATENT DOCUMENTS 4,626,964 * 12/1986 Azuma et al. ..................... 361/502
5,144,537 * 9/1992 Tsuchiya et al. ................... 361/502

FOREIGN PATENT DOCUMENTS

| 57-60828 | 4/1982 | (JP) . |
| 3-87010 | 4/1991 | (JP) . |
| 3-73426 | 7/1991 | (JP) . |
| 6-196364 | 7/1994 | (JP) . |
| 7-161589 | 6/1995 | (JP) . |
| 7-70448 | 7/1995 | (JP) . |
| 7-320987 | 12/1995 | (JP) . |
| 8-97102 | 4/1996 | (JP) . |
| 8-148388 | 6/1996 | (JP) . |
| 9-270370 | 10/1997 | (JP) . |

* cited by examiner

Primary Examiner—Anthony Dinkins
(74) Attorney, Agent, or Firm—Hutchins, Wheeler & Dittmar

(57) ABSTRACT

A polarizable electrode includes an collector electrode, and a single particle layer including carbon particles and formed on the collector electrode. A part of each of the carbon particles of the single particle layer is embedded in the collector electrode. The polarizable electrode is used for an electric double layer capacitor.

22 Claims, 2 Drawing Sheets

ELECTRIC DOUBLE LAYER CAPACITOR USING POLARIZABLE ELECTRODE OF SINGLE PARTICLE LAYER

BACKGROUND OF THE INVENTION

1. Field of the Invention

The present invention relates to a polarizable electrode and an electric double layer capacitor using the same. More particularly, the present invention relates to an electric double layer capacitor suited to instantaneously supply an electric power, and a polarizable electrode used in the electric double layer capacitor.

2. Description of the Related Art

An electric double layer capacitor is a capacitor having a large capacitance to accumulate charges in an electric double layer. A toxicant material such as a heavy metal and the like is not used as the material of the capacitor. Therefore, a load to environment is small. Also, unlike a secondary battery, a chemical reaction is not brought about. Therefore, the electric double layer capacitor is superior in a cyclic life of a charging and discharging operation. For this reason, the electric double layer capacitor is widely used for a backup power supply of a micro-computer, a memory or the like, instead of the secondary battery.

In recent years, an activated carbon/polyacen composite material as disclosed in Japanese Patent No. 2054380 is invented. Also, an activated carbon layer has become possible to be formed on an aluminum foil by using a binder, as disclosed in Japanese Laid Open Patent Application (JP-A-Showa 57-60828). As a result, an electric double layer capacitor having a large capacitance and a low resistance can be manufactured.

In this way, the electric double layer capacitor starts to be applied to various fields needing power. As such application fields, there are energy regeneration in a hybrid vehicle using an engine along with a motor and an electric vehicle, relaxation of electric power generation variation of solar power generation, wind power generation, a backup power supply for instant power fault, and rush current supply when a motor is started.

In these application fields, it is needed that the electric double layer capacitor has a low resistance and a high voltage so that the power from hundreds of watts to tens of kilowatts can be charged and discharged in several seconds in a high voltage equal to or greater than 100 V.

FIG. 1 is a sectional view illustrating a conventional electric double layer capacitor. Referring to FIG. 1, the electric double layer capacitor is composed of a basic cell 6, terminal plates 7 which are provided on both sides of the basic cell 6 and in which solder is plated on an aluminum foil, sets of bolt and nut, and insulation bushes 8. The basic cell 6 is composed of collector electrodes 3, a separator 4, gaskets 5 and polarizable electrodes 9. The polarizable electrodes 9 function as positive and negative electrodes. The separator 4 prevents formation of an electric short circuit between the polarizable electrodes 9 and allows ions to pass through the separator 4. The collector electrodes 3 are electrically connected to an external circuit and do not allow the electrolyte to pass through the collector electrodes 3. The gaskets 5 are used to insulate the collector electrodes 3 from each other and seals the electrolyte. There may be an electric double layer capacitor having a coin cell structure or a winding structure as electric double layer capacitor using organic electrolyte.

The operation voltage of the electric double layer capacitor is limited to a voltage range in which any electrochemical reaction does not occurs in the polarizable electrode and the collector electrode and further the electrolyte is not resolved. Therefore, the operation voltage is about 1 V in a solution type of electrolyte, and about 2.5 V in an organic type of electrolyte. Usually, it is necessary to connect the basic cells 6 in series based on a desired operation voltage so as to increase a breakdown voltage. Therefore, tens to hundreds electric double layer capacitors must be connected in series in the power application field in which the breakdown voltage equal to or higher than 100 V is required.

Typically, the polarizable electrode 9 of the electric double layer capacitor is composed of activated carbon. The same material is used for both of the polarizable electrodes 9. The polarizable electrode 9 may be formed as a paste type electrode in which activated carbon powder or activated carbon fiber and electrolyte are mixed. Instead, the polarizable electrode 9 may be formed as a cloth type electrode of activated carbon fibers or resin fiber holding the activated carbon powder. Otherwise, the polarizable electrode 9 may be formed as a solid type electrode in which activated carbon powder and carbon organic are coupled by binder such as Teflon, as disclosed in Japanese Patent Publication (JP-B-Heisei 7-70448). Also, an activated carbon/polyacen composite material are well known as the material of the binder portion for realization of capacitance. As disclosed in Japanese Laid Open Patent Application (JP-A-Heisei 8-97102), the polarizable electrode is also well known in which a part of the polarizable electrode is coated with carbon glass in order to prevent particles from falling off.

As the material of the collector electrode 3, conductive rubber, conductive elastomer, conductive polymer or the like is used as the solution type electrolyte, and metal such as aluminum or the like is used as the organic type electrolyte.

A porous film made of plastic and non-woven cloth are used as the material of the separator 4.

Conventionally, the electric connection between the polarizable electrode 9 and the collector electrode 3 is held by pressing with an outer case or bonding with organic binder. For example, a polarizable electrode and a collector electrode are bonded by using conductive adhesive, in Japanese Laid Open Patent Applications (JP-A-Heisei 7-161589, JP-A-Heisei 9-270370, and JP-A-Heisei 8-97102). A polarizable electrode and a collector electrode are formed as a unit by use of organic binder in Japanese Laid Open Patent Application (JP-A-Heisei 8-148388).

An example is disclosed in Japanese Laid Open Patent Application (JPU-A-Heisei 3-73426), in which carbon whiskers are used to couple a polarizable electrode and a collector electrode. Also, an electric double layer capacitor in which an collector electrode is in contact with a sintered polarizable electrode through a conductive metal film is disclosed in Japanese Laid Open Patent Application (JP-A-Heisei 3-87010). Further, a technique of pressing an collector electrode and the powder of activated carbon deposited on the collector electrode together with binder by a pressing machine is disclosed in Japanese Laid Open Patent Application (JP-A-Heisei 6-196364). In addition, an electrode structure in which fibers of activated carbon are disposed between an collector electrode and an electrode material by electrostatic planting is disclosed in Japanese Laid Open Patent Application (JP-A-Heisei 7-320987).

The resistance of the electric double layer capacitor is composed of the resistance of the polarizable electrode, the resistance of the electrolyte, the contact resistances between the component materials and the resistance of the electrolyte within the polarizable electrode. In order to reduce the resistances of the respective component materials, it is necessary that the resistivity of each component material is reduced, an area thereof is made wider and the thickness thereof is made thinner. The contact resistance can be reduced by increasing a contact area between the component materials. The resistance of the electrolyte within the polarizable electrode is different from the intrinsic resistance of the electrolyte. This is because movement of ions can not follow the change of an applied voltage in a macro pore having a small pore diameter in a sub-micron order.

Such a macro pore contains not only small pores of the activated carbon particle, but also gaps between the activated carbon particles and between the fibers. This resistance can be considered as a diffusion resistance, since the movement of the ions to the electric double layer capacitor is constricted by the shape of the small pore, similarly to a case that the movement of substance functions as a rate controlling parameter in an electrode reaction.

In order to reduce the diffusion resistance of the ions, it is necessary that the ions can move in a wider sectional area and movement distance of the ions are made shorter within the polarizable electrode. That is, it is enough to make the small pore diameter of the macro pore larger and to make the polarizable electrode thinner. However, if the number of macro pores is increased, a capacitance per volume is reduced. Thus, an optimization is required on the basis of a value of a charging and discharging current to be used.

As described above, the polarizable electrode is important to satisfy the following conditions. That is, the volume of the macro pore is as large as possible to the extent that an capacitance per volume is not decreased, the apparent electrode area is wide, the thickness of the electrode is thin and the polarizable electrode is in densely contact with the collector electrode. In addition, it is desirable that the electric double layer capacitor has the laminate structure such that the electric double layer capacitors can be connected with a low resistance in the series connection of them for a high voltage application.

In order to reduce the contact resistance between the polarizable electrode and the collector electrode made of the activated carbon, the method is conventionally adopted in which a pressure is applied from an external portion, or organic binder or conductive adhesive is used. The pressure applied from the external portion must be made higher in the case of the polarizable electrode of a paste type, a cloth shape, and a solid shape using organic binder. In this case, usually, the applied pressure becomes tens of kg/cm$^2$. Thus, the outer portion becomes large to keep the pressure in case of the wide electrode area. This results in a defect that an energy density per capacitor volume or weight is reduced.

The solid type polarizable electrode coupled with carbon or made of the activated carbon/polyacen composite material is higher in rigidity. Accordingly, a high flatness is required for the contact surface with the collector electrode. This leads a problem that a forming process and a polishing process are required in a high accuracy so that manufacturing cost becomes expensive.

Further, in the conventional polarization electrode, the macro pore has a three-dimensionally complex structure. Even if the volume of the macro pore is mad e larger, the movement distance of an ion is long within the polarizable electrode. Therefore, it is impossible to achieve an excellent effect that the diffusion resistance can be reduced.

Furthermore, in the polarizable electrode using organic binder, there are problems that the macro pore is clogged by the organic binder particles and that the surface area of the activated carbon particle is made narrower.

SUMMARY OF THE INVENTION

The present invention is accomplished to solve the above-mentioned problems. Therefore, an object of the present invention is to provide a polarizable electrode of an electric double layer capacitor in which a diffusion resistance is further reduced.

Another object of the present invention is to provide a polarizable electrode in which a contact resistance is further reduced, and a method for manufacturing the same.

Still another object of the present invention is to provide a polarizable electrode in which a diffusion resistance is further reduced and at the same time as a contact resistance is further reduced, and a method for manufacturing the same.

Yet still another object of the present invention is to provide a polarizable electrode in which a high flatness is not required for a contact surface in order to decrease the manufacturing cost, and a method for manufacturing the same.

It is also an object of the present invention to provide a polarizable electrode in which a high pressure is not required for a contact surface in order to decrease a manufacturing cost, and a method for manufacturing the same.

Another object of the present invention is to provide an electric double layer capacitor using any one of the above-mentioned polarizable electrodes.

In order to achieve an aspect of the present invention, a polarizable electrode for an electric double layer capacitor, includes a collector electrode, and a single particle layer including carbon particles and formed on the collector electrode. A part of each of the carbon particles of the single particle layer is embedded in the collector electrode.

The carbon particles of the single particle layer are activated carbon particles. It is desirable that each of the carbon particles of the single particle layer is formed of a material selected from the group consisting of an activated carbon powder, a composite material made of activated carbon and polyacen, a composite material made of activated carbon and a carbon composite material, and a mixture thereof. Also, it is desirable that each of the carbon particles is substantially spherical in shape. The carbon particles desirably have an average particle diameter in a range equal to or greater than 5 $\mu$m and equal to or less than 500 $\mu$m. More desirably, the carbon particles have an average particle diameter in a range equal to or greater than 150 $\mu$m and equal to or less than 250 $\mu$m. Each of the carbon particles may be substantially ellipsoidal in shape. In this case, it is desirable that the carbon particles have a ratio of a short diameter to a long diameter of ⅗. More desirably, the carbon particles have the short diameter and the long diameter in a range of 150 $\mu$m to 250 $\mu$m.

The collector electrode is made of a material selected from the group consisting of a conductive rubber, a conductive elastomer, a conductive polymer, and a composite material thereof. Otherwise, the collector electrode is made of a composite material of a metal film and a material selected from the group consisting of a conductive rubber, a conductive elastomer, a conductive polymer and a composite material thereof.

In order to achieve another aspect of the present invention, an electric double layer capacitor includes a pair of polarizable electrodes, each of which includes an collector electrode and a single particle layer of carbon particles formed on the collector electrode, gaskets disposed between the collector electrodes to seal an electrolyte, and a separator disposed between the polarizable electrodes. A part of each of the carbon particles of the single particle layer is embedded in the collector electrode.

In order to achieve still another aspect of the present invention, a method of manufacturing an electric double layer capacitor, includes the steps of:

forming polarizable electrodes; and completing an electric double layer capacitor using a separator, terminal plates, gaskets and the polarizable electrodes, and wherein the step of forming polarizable electrodes comprises the steps of:

temporarily placing carbon particles on an adhesive film;

removing from the adhesive film, a portion of the carbon particles other than the carbon particles of a single layer; and transferring the carbon particles from the adhesive film to an collector electrode such that a part of each of the carbon particles is embedded into the collector electrode.

The transferring step may include:

facing the adhesive film with the collector electrode on a side on which the carbon particles are placed; and pressing the adhesive film to the collector electrode such that the particles are transferred from the adhesive film to the collector electrode. Also, the transferring step further includes applying heat to the adhesive film. The step of applying heat desirably includes applying the heat to the adhesive film to a temperature at which adhesive force of the adhesive film is lost. It is desirable that the step of applying heat and the pressing step are performed at a same time.

The pressing step includes pressing the adhesive film to the collector electrode by a hydrostatic pressure pressing machine. In this case, the pressing step by the hydrostatic pressure pressing machine is performed in which a water temperature is set to a temperature at which thermal separation occurs in the adhesive film as a thermal separation sheet.

The method may further includes classifying the carbon particles to have sizes in a predetermined range. In this case, the classifying step includes classifying the carbon particles such that the carbon particles have a particle diameter difference in a range of 100 μm. For example, the carbon particles have an average particle diameter in a range equal to or greater than 5 and equal to or less than 500 μm. More desirably, the carbon particles have an average particle diameter in a range equal to or greater than 150 μm and equal to or less than 250 μm.

DESCRIPTION OF THE PREFERRED EMBODIMENTS

A polarizable electrode used in an electric double layer capacitor of the present invention will be described below in detail with reference to the attached drawings.

Figure 1:
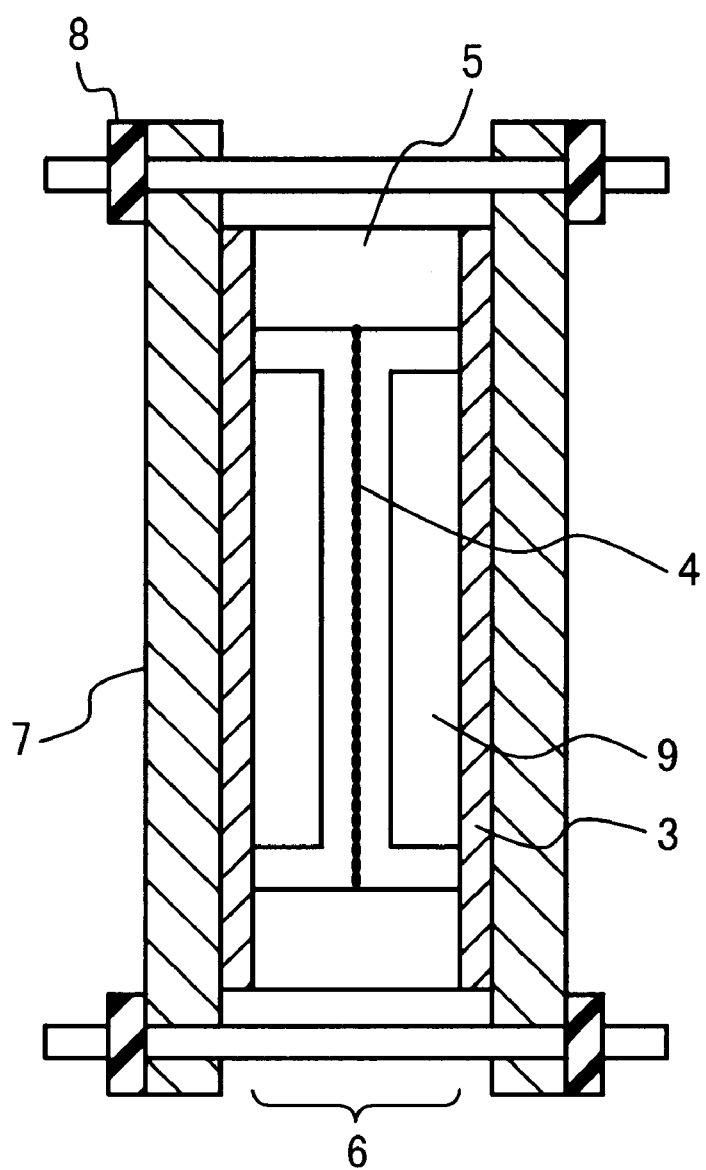
FIG. 1 is a diagram illustrating the structure of a conventional electric double layer capacitor.
Figure 2:
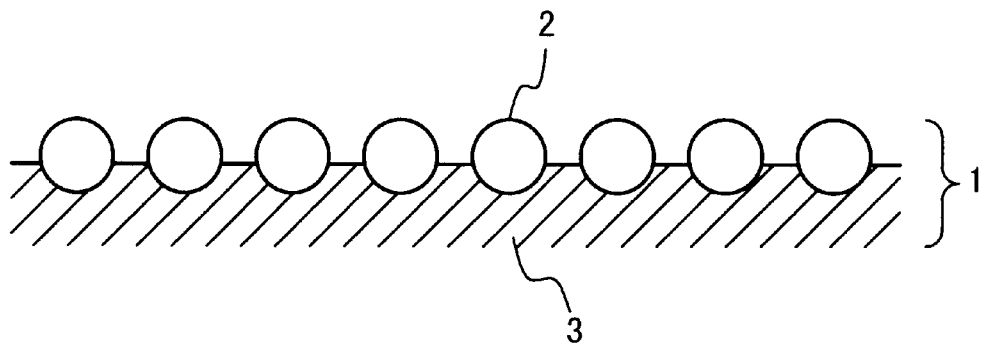
FIG. 2 is a cross sectional view of a polarizable electrode used in an electric double layer capacitor according to an embodiment of the present invention.

The polarizable electrode used in the electric double layer capacitor of the present invention will be described. FIG. 2 shows a structure of the polarizable electrode used in the electric double layer capacitor according to this embodiment.

Referring to FIG. 2, the polarizable electrode 1 is composed of a collector electrode 3 and a single layer of particles 2 as a single particle layer formed on the collector electrode 3. A part of each particle 2 of the single particle layer is embedded in and coupled with the collector electrode 3. Thus, the thickness of the single particle layer from the surface of the collector electrode 3 is thinner than the diameter of each particle of the single particle layer.

Since the particle is embedded in the collector electrode 3 as mentioned above, there is no need for any device of pressing and fitting the particle into the collector electrode by a pressure from an external portion. Also, there is neither need to use any adhesive or any organic binder nor need to coat with carbon glass. Thus, the surface of the particle is never processed. Further, since the single particle layer is composed of the particles, macro pores can be formed into a movement direction of an ion to decrease a movement distance of the ion.

The single particle layer 2 implies that the layer 2 is composed of particles of a single layer in a thickness direction. It is desirable that each particle is spherical. However, it is not necessary that the single particle is severely spherical. Therefore, a ratio of a long diameter and short diameter of the particle is sufficient to fall within a predetermined range. Also, it is desirable that the diameters of the particles fall in a predetermined range to have approximately equal diameters.

As mentioned above, there is no case that the width of the single particle layer from the surface of the collector electrode 3 exceeds the diameter of the single particle thereof at any position. The single particle layer 2 is substantially constituted to have such a structure. However, this does not imply that there is no portion where the particles overlap with each other to form two layers. Although this is not preferable in the present invention, the reason why there is partially a portion where the particles overlap with each other to form the two layers results from the accuracy in a manufacturing process.

As the material of the collector electrode 3, it is desirable to use conductive rubber such as conductive butyl rubber, conductive elastomer or conductive polymer, or a composite material in which two or more of the above are laminated to form a composite material. Otherwise, as the material of the collector electrode 3, a laminate material may be used in which metal foil and one of the conductive rubber, the conductive elastomer and the conductive polymer are laminated.

As the particle of the single particle layer, it is desirable to use an activated carbon particle, a particle of a composite material of activated carbon and polyacen, or a particle of a composite material of activated carbon and carbon. Also, as the particle of the single particle layer, a particle of a composite material may be used in which two or more of the above are mixed. The activated carbon particle may be a spherical activated particle formed of pitch or spherical thermoplastic resin such as phenol-formaldehyde resin, or may be formed to have a spherical structure when activated carbon/polyacen composite material or activated carbon/carbon composite material is synthesized.

As the particle of the single particle layer, it is especially desirable that the average diameter of the particles is equal to or greater than 5 μm and equal to or less than 500 μm and further the particle is spherical. In this case, the thickness of the single particle layer from the surface of the collector electrode 3 can be made thinner, as mentioned above. Also, by forming the particles to have the spherical shape, the variation of the sizes of the particles can be reduced. As a result, the variation in the thickness of the single particle layer can be reduced.

In order to embed a part of the particle into the collector electrode 3, the particles are temporarily fixed on an adhesive tape. Then, the adhesive tape and the collector electrode 3 are pressed to each other in such a way that the adhesive tape is forcedly pressed to the collector electrode 3. Accordingly, the particles of the single particle layer can be easily transferred or stuck into the collector electrode 3. Such a method for manufacturing the polarizable electrode becomes extremely low in cost.

As the adhesive tape, it is especially desirable to use a thermal separation sheet in which the application of heat causes the adhesive force to be lost. As a press machine for the pressing operation, it is especially desirable to use a hydrostatic pressure press in which a water temperature is set to a temperature at which the thermal separation occurs in the thermal separation sheet.

The single particle layer can be achieved by temporarily fixing the activated carbon particles on the adhesive sheet. A uniform pressure can be even applied to the particles having diameters different from each other by using the hydrostatic pressure press, to embed a part of each particle into the collector electrode 3. In the present invention, the thermal separation sheet is used such that the adhesive force of the adhesive sheet is lost through the application of the heat to the adhesive sheet. Also, the water temperature of the hydrostatic pressure press is set to the temperature at which the thermal separation occurs. Thus, the pressing operation and the separating operation are carried out at the same time. As a result, all the activated carbon particles on the adhesive sheet can be easily transferred onto the side of the collector electrode 3 at a single processing process.

Figure 3:
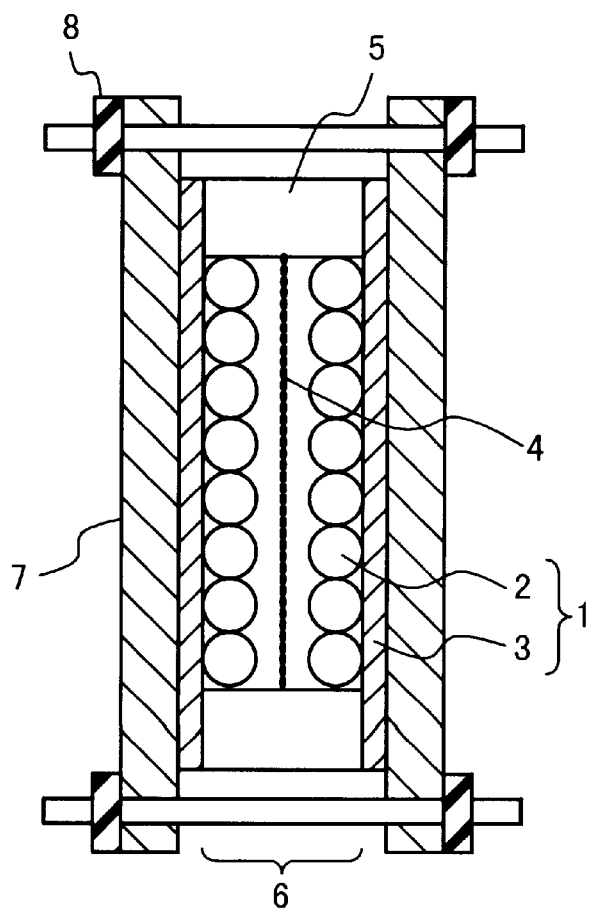
FIG. 3 is a cross sectional view illustrating the structure of the electric double layer capacitor according to the embodiment of the present invention.

FIG. 3 is a cross sectional view illustrating the structure of the electric double layer capacitor using the polarizable electrode according to the embodiment in the present invention. Referring now to FIG. 3, the electric double layer capacitor is composed of a basic cell 6, terminal plates 7 which are provided on both sides of the basic cells 6 and in which solder is plated on an aluminum film, sets of bolt and nut, and insulation bushes 8. The basic cell 6 is composed of polarizable electrodes 1, collector electrodes 3, a separator 4 and gaskets 5. The polarizable electrodes 1 have the structures mentioned above and function as positive and negative electrodes, respectively. The separator 4 prevents formation of an electric shorted-circuit between the polarizable electrodes 1 and passes only ions. The collector electrodes 3 of the polarizable electrodes 1 are electrically connected to an external circuit and do not pass electrolyte. The gaskets 5 insulate between the collector electrode 3 and seal the electrolyte. The electrolyte is impregnated into the polarizable electrode 1 and the separator 4.

The separator 4 has an outer dimension of 68×48 mm and a thickness of 25 μm, and it is a fine porous film made of polypropylene to which a hydrophilic process is performed. The gasket 5 has an outer dimension of 84×64 mm, an inner dimension of 70×50 mm and a thickness of 50 μm, and it is formed of polypropylene in the form of a frame. The separator 4 and the gasket 5 are arranged as shown in FIG. 3.

The whole structure is decompressed. At the same time, thermal fusion is performed on the both sides where a pair of the collector electrodes 3 and the gasket 5 are in contact with each other. Thus, the basic cell 6 is formed.

The electric double layer capacitor having an operation voltage of 1.0 V can be formed by placing the terminal plates 7 from both the sides of the basic cell 6 and then by fixing with the sets of bolt and nut through the insulation bushes 8.

[First Embodiment]

The activated carbon particles are formed of phenol-formaldehyde resin as a raw material. Such activated particles are available from KANEBO Co., Ltd., in product name "Bellfine". A specific surface area thereof is 1200 $m^2/g$. The activated carbon particles having various particle diameters are classified such that the diameters of the spherical particles in the single particle layer 2 are made approximately uniform. The average particle diameter is 200 μm. The particles having the diameter equal to or less than 150 μm and the particles having the diameter equal to or greater than 250 μm are substantially removed.

Next, a thermal separation sheet whose adhesive force is lost at 90° C. is cut out to have the size of 68×48 mm. Such a thermal separation sheet is available from NITTODENKO, in product name of "RIBAARUFA". The adhesive portion of the thermal separation sheet is covered with the activated carbon powder composed of the spherical particles. Then, the adhesive portion is slightly shaken so that the activated carbon particles which are not in directly contact with the adhesive sheet are shaken off. Thus, the single particle layer 2 of the activated carbon particles can be formed.

The collector electrode 3 is formed to have the thickness of about 50 μm. A conductive butyl rubber sheet is cut out to have the size of 84×64 mm and the cut out portion of the conductive butyl rubber is used as the collector electrode 3. The above-mentioned thermal separation sheet on which the activated carbon layer 2 is deposited is placed in such a manner that the collector electrode 3 and the spherical activated carbon particles are in contact with each other at the central portion of the collector electrode 3. This thermal separation sheet is placed into a vinyl bag, and then the pressure within the bag is reduced. Then, the opening of the bag is thermally fused to form a vacuum package. Then, it is pressed at the pressure of 30 $kg/cm^2$ by the hydrostatic pressure press. A water temperature at this time is 90° C. at which the adhesive force of the thermal separation sheet is lost. After the pressing operation by the hydrostatic pressure press, the collector electrode with the thermal separation sheet is taken away from the vinyl bag, and then the thermal separation sheet is removed. As a result, the polarizable electrode 1 can be obtained in which the collector electrode 3 and the single particle layer are made as a unit.

In this embodiment, sulfate solution of 30 wt% is dropped by 0.1 cc on the side of the activated carbon layer 2 of the polarizable electrode 1, and then, the whole structure of the polarizable electrode 1 is decompressed. Thus, the electrolyte is impregnated into the activated carbon layer 2. The electrolyte is also impregnated into the separator 4, similarly to the case of the polarizable electrode 1.

[Second Embodiment]

The activated carbon power has the specific surface area of 1500 $m^2/g$ and the average particle diameter of 10 μm. The phenol-formaldehyde resin available from KANEBO, in the product name of "Bellpearl S890" has the weight-average molecular weight of 10,000 or more. The phenol-formaldehyde resin in the form of powder is added to the activated carbon particle powder such that the weight ratio of the phenol-formaldehyde resin to the activated carbon particle powder is 7:3. Ethanol is added to the mixture powder of the activated carbon powder and the phenol-formaldehyde resin such that the weight ratio of ethanol to the mixture powder is 1:1. Then, particles are formed to be spherical in shape. The formed particles are carbonized at 900° C., and then the sizes of the particles are made uniform by crushing and classifying. Thus, the spherical activated carbon/polyacen composite material can be formed to have the average particle diameter of 200 $\mu$m. The particles having the diameter of 150 $\mu$m or less and the particle having the diameter of 250 $\mu$m or more are removed. Thereafter, the electric double layer capacitor having the operation voltage of 1.0 V is produced as a prototype, similarly to the case of the first embodiment.

[Third Embodiment]

Fluid resol type of phenol-formaldehyde resin is added to the activated carbon powder such that the weight ratio of the phenol-formaldehyde resin to the activated carbon powder is 7:3. The activated carbon powder has the specific surface area of 1500 $m^2/g$ and the average particle diameter of 10 $\mu$m. Then, the particle is formed. The formed particles are carbonized at 900° C., and then the sizes of the particles are made uniform by crushing and classifying. Thus, the spherical activated carbon/polyacen composite material can be formed to have the average particle diameter of 200 $\mu$m. The particles having the diameter of 150 $\mu$m or less and the particles having the diameter of 250 $\mu$m or more are removed. Thereafter, the electric double layer capacitor having the operation voltage of 1.0 V is produced as a prototype, similarly to the case of the first embodiment.

[Fourth Embodiment]

As the collector electrode 3, the conductive butyl rubber is coated on the aluminum film to have the thickness of 20 $\mu$m. The aluminum film has the thickness of 30 $\mu$m. Then, the spherical activated carbon particles are embedded into the surface of the collector electrode 3 on which the conductive butyl rubber is coated. The components other than the collector electrode 3 are formed similarly to the case of the first embodiment and the polarizable electrode 1 of the present invention is obtained. This polarizable electrode 1 is used to produce as a prototype an electric double layer capacitor having the operation voltage of 2.5 V. The electric double layer capacitor uses organic electrolyte. Propylene carbonate is used as solvent for the organic electrolyte, and fourth-class ammonium salt is used as electrolyte material. The process is similar to that of the first embodiment except that the prototype is formed in a dry room in which water component is managed and that the used electrolyte is organic.

[Fifth Embodiment]

The spherical activated carbon particles available from KANEBO Co., Ltd., in a product name of "Bellfine" is classified by using a screen mesh. The specific surface area of the classified particle is 1200 $m^2/g$ and an average particle diameter is 400 $\mu$m. Diameters of the used screen mesh are 250 $\mu$m, 300 $\mu$m, 425 $\mu$m, 500 $\mu$m, 600 $\mu$m, 710 $\mu$m and 850 $\mu$m. The classified spherical activated carbon particles are used to produce as a prototype the electric double layer capacitor, similarly to the case of the first embodiment. The electric double layer capacitor has the operation voltage of 1.0 V. The thickness of each of the used gaskets 5 is 500 $\mu$m, and corrected based on the extension of the collector electrode 3.

[Sixth Embodiment]

The spherical activated carbon particles available from KANEBO Co., Ltd., in a product name of "Bellfine" are used. The activated carbon particles have the specific surface area of 1200 $m^2/g$ and the average particle diameter of 400 $\mu$m. In the activated carbon particles, the size of each particle is not adjusted in particular. The spherical activated carbon particles are used to produce as a prototype the electric double layer capacitor, similarly to the case of the first embodiment. The electric double layer capacitor has the operation voltage of 1.0 V. However, a polypropylene film having the thickness of 20 $\mu$m is used for the gasket 5.

[Seventh Embodiment]

The activated carbon particles having the specific surface area of 1200 $m^2/g$ and the average particle diameter of 15 $\mu$m are classified by an air flow classifier. Thus, the activated carbon powders having the average particle diameters of 10 $\mu$m, 7 $\mu$m and 3 $\mu$m are obtained. The obtained activated carbon powders are used to produce as a prototype the electric double layer capacitors having the operation voltage of 1.0 V, similarly to the case of the first embodiment.

COMPARISON EXAMPLE

The phenol-formaldehyde resin in the form of powder available from KANEBO in a product name of "Bellpearl S890" is added to the activated carbon particles such that the weight ratio of the phenol-formaldehyde resin to the activated carbon particles is 7:3. The phenol-formaldehyde resin has the weight-average molecular weight of 10,000 or more, and the activated carbon particles have the specific surface area of 1500 $m^2/g$ and the average particle diameter of 10 $\mu$m. Then, the phenol-formaldehyde resin and the activated carbon particles are dryly mixed with each other. This mixture power is thermally pressed at 180° C. and then baked in a non-oxidized atmosphere at 900° C. to form the activated carbon/polyacen composite material. A portion of the formed activated carbon/polyacen composite material is cut to have the size of 68×48 mm and then polished to have the thickness of 1.0 $\mu$m. The polished portion of the activated carbon/polyacen composite material is used as the polarizable electrode 9.

A separator 4 formed of glass fiber and having the thickness of 500 $\mu$m is disposed between a pair of polarizable electrodes 9. Then, the gasket 5 and the collector electrode 3 are bonded by epoxy adhesive. After that, the sulfate solution of 30 wt % is poured from a pour pore disposed on the side of the gasket 5. Then, a plug is inserted into the pour pore and supersonically fused to close the pour pore. Thus, the basic cell 6 is formed.

The basic cell 6 is supported by terminal plates 7 and the terminal plates 7 are fixed by sets of bolt and nut through the insulation bushes 8. The terminal plates 7 are formed by performing solder plating to an aluminum film. Thus, the electric double layer capacitor having the operation voltage of 1.0 V is produced as a prototype.

An equivalent series resistance (ESR) and a capacitance are measured at 1 kHz for the electric double layer capacitors in the various embodiments and the comparison example. The quivalent series resistance (ESR) implies a resistance other than a diffusion resistance. The equivalent series resistance (ESR) is determined by applying an AC voltage of 1 kHz and 10 mV to the electric double layer capacitors and then by measuring a value of a current and a phase difference with respect to the applied voltage. Any DC bias is not applied at this time. A method for measuring the capacitance is a constant current discharging method.

More specifically, except that the voltage of 1.0 V is applied for 30 minutes to the capacitors other than the capacitor in the fourth embodiment, such that the capacitors are charged. Also, the capacitor in the fourth embodiment is applied with the voltage of 2.5 V for 30 minutes. Immediately after that, the capacitor is discharged at a constant current I to measure a time Δt during which the voltage of the capacitor is decreased from 60% of the charged voltage to 50%. This corresponds the voltage change from 0.6 V to 0.5 V in the capacitors other than that of the fourth embodiment and from 1.5 V to 1.25 V in the capacitor of the fourth embodiment. The capacitance at this time can be calculated as follows:

$$C = I \times \Delta t / \Delta V$$

The value of the diffusion resistance can be estimated from a change ΔC of the capacitance C of the capacitor when the discharge current I is increased by ΔI. For this time, the change ratio ΔC/C is determined by measuring a capacitance 1 when the discharge current is 100 mA and a capacitance 2 when the discharge current is 10A. The result is shown in the following table 1.

parison example. Therefore, it could be understood that the sufficient effect is provided even in the capacitor using the organic electrolyte In the fifth embodiment, the activated carbon particles having various particle sizes are used, compared with the other embodiments. Liquid leakage occurs in the case that the diameter of the particle exceeds 500 μm. This is because there is few contact area between the activated carbon particle and the collector electrode 3 than those between the collector electrode 3 and the activated carbon particle having smaller diameters. For this reason, the pressure is concentrated on a part of the collector electrode 3 at the time of the hydrostatic pressure pressing operation so that the part of the collector electrode 3 is broken.

Also, in the sixth embodiment, the pressure is concentrated on the activated carbon particles having the large particle diameter. Thus, the collector electrode 3 is broken so that the liquid leakage occurs there.

In the case of the particle diameter of 250 μm or less of the fifth embodiment and in the sixth embodiment, the variations in the particle diameters are both large. Thus, all

TABLE 1

|  | particle diameter (μm) | transfer of particles | outer appearance | ESR (mΩ) | voltage (V) | capacitor 1 (F) | capacitor 2 (F) | ΔC/C (%) |
|---|---|---|---|---|---|---|---|---|
| Embodiment 1 | 250–150 | good | good | 4 | 1 | 45 | 43 | −4.4 |
| Embodiment 2 | 250–150 | good | good | 7 | 1 | 52 | 41 | −21.2 |
| Embodiment 3 | 250–150 | good | good | 6 | 1 | 46 | 35 | −23.9 |
| Embodiment 4 | 250–150 | good | good | 50 | 2.5 | 24 | 17 | −29.2 |
| Embodiment 5 | <250 | patially not good | good | 4 | 1 | 34 | 31 | −8.8 |
|  | 250–300 | good | good | 4 | 1 | 45 | 43 | −4.4 |
|  | 300–425 | good | good | 4 | 1 | 46 | 43 | −6.5 |
|  | 425–500 | good | good | 4 | 1 | 46 | 44 | −4.3 |
|  | 500–600 | good | leakage |  |  |  |  |  |
|  | 600–710 | good | leakage |  |  |  |  |  |
|  | 710–850 | good | leakage |  |  |  |  |  |
|  | >850 | good | leakage |  |  |  |  |  |
| Embodiment 6 | — | patially not good | leakage |  |  |  |  |  |
| Embodiment 7 | 10 | good | good | 5 | 1 | 47 | 42 | −10.6 |
|  | 7 | good | good | 8 | 1 | 48 | 43 | −10.4 |
|  | 5 | good | good | 11 | 1 | 46 | 41 | −10.9 |
|  | 3 | not good |  |  |  |  |  |  |
| Comparison | — | good | good | 10 | 1 | 260 | 120 | −53.8 |

In the comparison example, the thickness of the polarizable electrode is about 5 times thicker than those of the electrodes in the various embodiments, and the capacitance 1 thereof is also large. The reason why the capacitance 1 of the second and third embodiments are larger than that of the first embodiment is that the inside of each activated carbon particles contributes to the capacitance. On the contrary, since the diffusion resistance functions in the inside of the particle, the capacitance ratio ΔC/C is also large. However, it could be understood that the capacitors of the second and third embodiments are largely improved in characteristics, compared with the comparison example.

Since the organic electrolyte is used in the fourth embodiment, the breakdown voltage thereof is high. However, the capacitance of the electric double layer is lower than that of the solution type capacitor. The capacitance of the organic type electric double layer capacitor is also an approximately half of that of the solution type capacitor. Also, since the resistance of the electrolyte is high, the equivalent series resistance (ESR) is approximately 10 times more than those of the other embodiments. However, the capacitance ratio ΔC/C is lower than that of the comthe particles can not be transferred to the collector electrode 3. Therefore, the considerable particles remain on the thermal separation sheet.

In the seventh embodiment, the activated carbon particles having the average particle diameter of 3 μm can not be transferred. It could be considered that since such an activated carbon particle has a large contact area, the pressure is not sufficiently applied to the particles so that the particles can not be transferred due to the adhesive force of the thermal separation sheet. Therefore, the pressure value would be necessary to be adjusted based on the average particle diameter.

As can be seen from the first to sixth embodiments, it is desirable that the particle diameters are uniform to a degree. The activated carbon particles in the form of a sphere are suitable for this uniformity. However, it is not always necessary that the activated carbon is perfectly spherical. It could be understood that the particles can be transferred with no problem, if the long diameter and the short diameter fall within the range from 150 μm to 250 μm, as in the first embodiment.

As mentioned above, the polarizable electrode is composed of the single layer of the particles. Therefore, the diffusion resistance can be improved. Also, it would be understood that even if the discharge operation is carried out in a large current, the reduction of the capacitance is small. The polarizable electrode may be made of any one of the activated carbon, the activated carbon/polyacen composite material, and the activated carbon/carbon composite material. Further, it is desirable that the particle diameter ranges between 5 μm and 500 μm.

In particular, if the spherical activated carbon particles are used, it is easy to make the particle diameters uniform. Also, if the particle diameters are uniform, it is possible to transfer the particles from the thermal separation sheet to the collector electrode in the probability of substantially 100%. However, it is not necessary that the activated carbon is completely spherical. There is no problem if the difference between the long diameter and the short diameter of the particles is small.

The collector electrode may be made of any one of the conductive rubber, the conductive elastomer and the conductive polymer, or may be made of a laminate structure in which two or more of the above are laminated or a laminate structure of the composite material and a metal film. Further, even if the electrolyte material is the solution type or the organic type, the diffusion resistance can be reduced. Thus, it is presumed that the similar result can be attained even in the solid type electrolyte in the form of gel.

The polarizable electrode of the present invention is the electrode in which the diffusion resistance and the contact resistance are low. The polarizable electrode has the performance superior in instant charging and large electric power supply. Further, the cost necessary to manufacture the polarizable electrode is low.

What is claimed is:

1. A polarizable electrode for an electric double layer capacitor, comprising:
    a collector electrode; and
    a single particle layer including carbon particles and formed on said collector electrode, wherein a part of each of said carbon particles of said single particle layer is embedded in said collector electrode.

2. A polarizable electrode according to claim 1, wherein said carbon particles of said single particle layer are activated carbon particles.

3. A polarizable electrode according to claim 2, wherein each of said carbon particles of said single particle layer is formed of a material selected from the group consisting of an activated carbon powder, a composite material made of activated carbon and polyacen, a composite material made of activated carbon and a carbon composite material, and a mixture thereof.

4. A polarizable electrode according to claim 1, wherein each of said carbon particles is substantially spherical in shape.

5. A polarizable electrode according to claim 4, wherein said carbon particles have an average particle diameter in a range equal to or greater than 5 μm and equal to or less than 500 μm.

6. A polarizable electrode according to claim 5, wherein said carbon particles have an average particle diameter in a range equal to or greater than 150 μm and equal to or less than 250 μm.

7. A polarizable electrode according to claim 1, wherein each of said carbon particles is substantially ellipsoidal in shape.

8. A polarizable electrode according to claim 7, wherein said carbon particles have a ratio of a short diameter to a long diameter of 3/5.

9. A polarizable electrode according to claim 8, wherein said carbon particles have the short diameter and the long diameter in a range of 150 μm to 250 μm.

10. A polarizable electrode according to claim 1, wherein said collector electrode is made of a material selected from the group consisting of a conductive rubber, a conductive elastomer, a conductive polymer, and a composite material thereof.

11. A polarizable electrode according to claim 1, wherein said collector electrode is made of a composite material of a metal film and a material selected from the group consisting of a conductive rubber, a conductive elastomer, a conductive polymer and a composite material thereof.

12. An electric double layer capacitor comprising:
    a pair of polarizable electrodes, each of which includes a collector electrode and a single particle layer of carbon particles formed on said collector electrode, wherein a part of each of said carbon particles of said single particle layer is embedded in said collector electrode;
    gaskets disposed between said collector electrodes to seal an electrolyte; and
    a separator disposed between said polarizable electrodes.

13. An electric double layer capacitor according to claim 12, wherein said carbon particles of said single particle layer are activated carbon particles.

14. An electric double layer capacitor according to claim 12, wherein each of said carbon particles of said single particle layer is formed of a material selected from the group consisting of an activated carbon powder, a composite material made of activated carbon and polyacen, a composite material made of activated carbon and a carbon composite material, and a mixture thereof.

15. An electric double layer capacitor according to claim 12, wherein each of said carbon particles is substantially spherical in shape.

16. An electric double layer capacitor according to claim 15, wherein said carbon particles have an average particle diameter in a range equal to or greater than 5 μm and equal to or less than 500 μm.

17. An electric double layer capacitor according to claim 16, wherein said carbon particles have an average particle diameter in a range equal to or greater than 150 μm and equal to or less than 250 μm.

18. An electric double layer capacitor according to claim 12, wherein each of said carbon particles is substantially ellipsoidal in shape.

19. An electric double layer capacitor according to claim 18, wherein said carbon particles have a ratio of a short diameter to a long diameter of 3/5.

20. An electric double layer capacitor according to claim 19, wherein said carbon particles have the short diameter and the long diameter in a range of 150 μm to 250 μm.

21. An electric double layer capacitor according to claim 12, wherein said collector electrode is made of a material selected from the group consisting of a conductive rubber, a conductive elastomer, a conductive polymer, and a composite material thereof.

22. An electric double layer capacitor according to claim 12, wherein said collector electrode is made of a composite material of a metal film and a material selected from the group consisting of a conductive rubber, a conductive elastomer, a conductive polymer and a composite material thereof.

* * * * *